April 10, 1928.
A. B. YORK
1,665,764
PUNCTURING MACHINE
Filed June 4, 1927
2 Sheets-Sheet 1
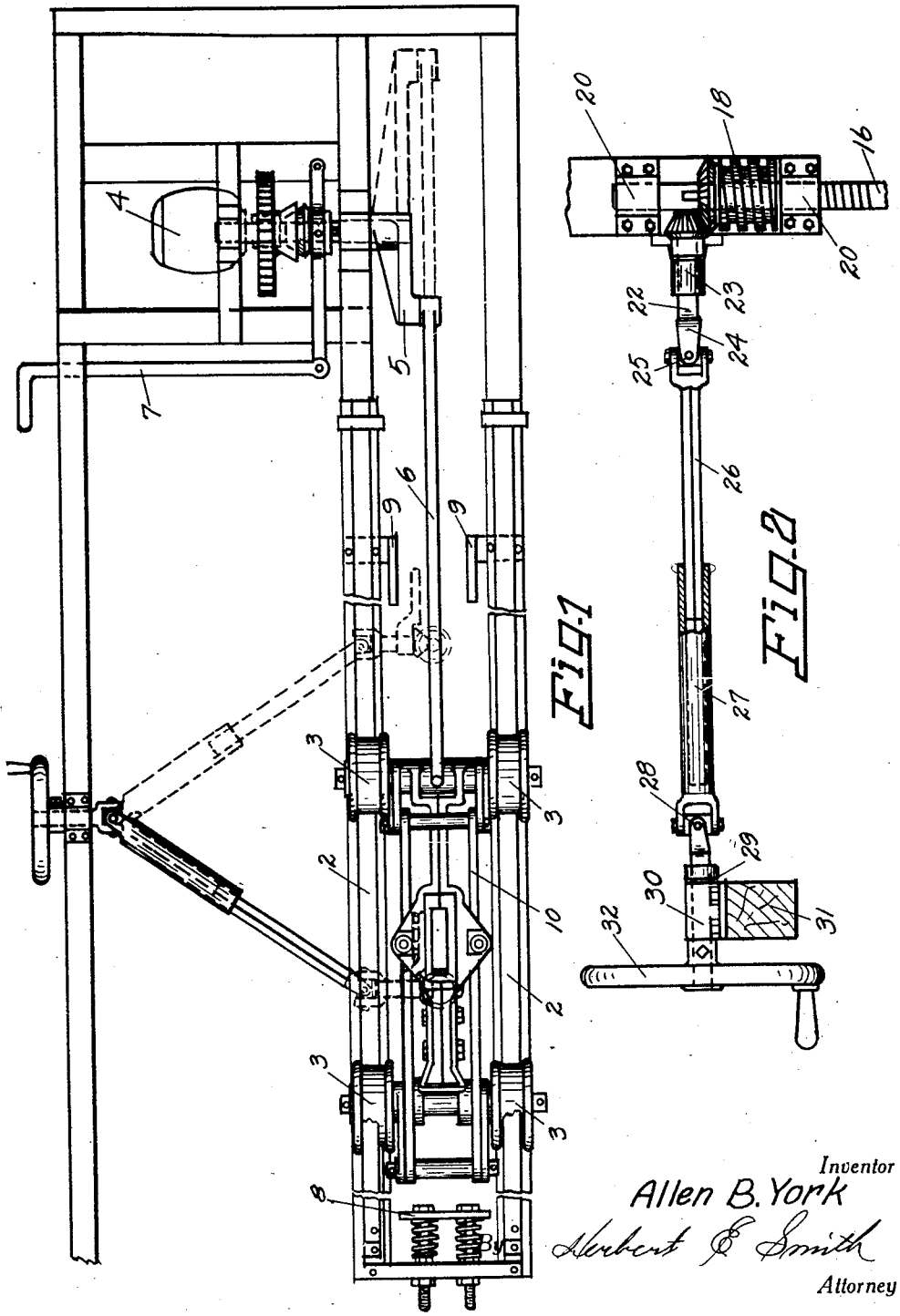
Inventor
Allen B. York
Herbert E. Smith
Attorney April 10, 1928.
A. B. YORK
PUNCTURING MACHINE
Filed June 4, 1927
1,665,764
2 Sheets-Sheet 2
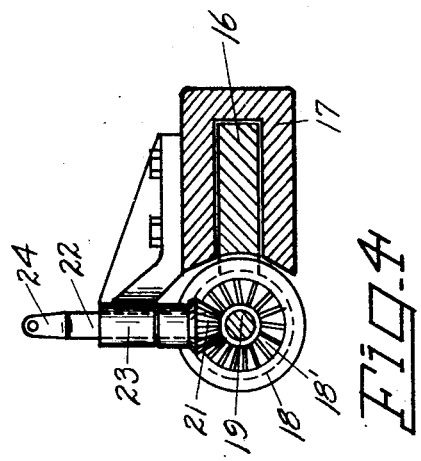
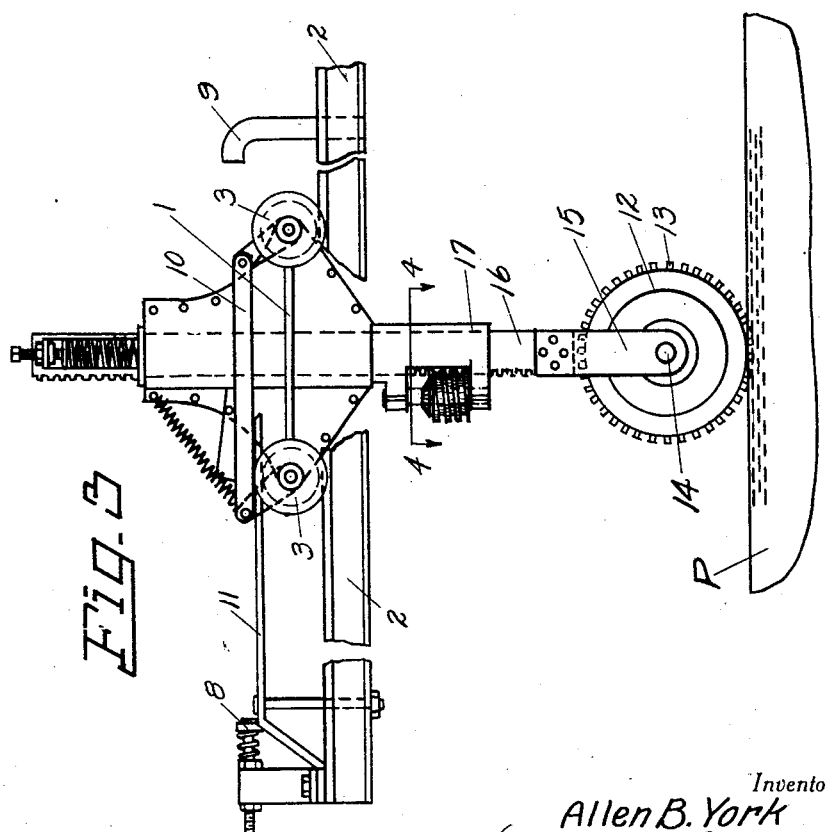
Inventor
Allen B. York
By Herbert E. Smith
Attorney Patented Apr. 10, 1928.

1,665,764

UNITED STATES PATENT OFFICE.

ALLEN B. YORK, OF SANDPOINT, IDAHO, ASSIGNOR TO MALVERN L. BRUCE, OF SANDPOINT, IDAHO.

PUNCTURING MACHINE.

Application filed June 4, 1927. Serial No. 196,622.

My present invention relates to improvements in puncturing machines of the class utilized for puncturing or perforating certain portions of telephone, telegraph and other poles or similar wooden structures, and particularly as illustrated in the patent of Charles S. Nelson, dated March 29, 1927, and numbered 1,622,538.

In the above mentioned patent an overhead carriage is utilized in connection with a vertically reciprocable puncturing or perforating tool or wheel that travels longitudinally over the surface of the pole for perforating or puncturing its surface preparatory to a bath in creosote or other preservative solution. Means are provided for reciprocating the overhead carriage, and at the end of its outstroke or working stroke of the carriage and rotary perforating tool or wheel, the latter is automatically lifted to inoperative position for its return stroke, and then moved to operative position, for the successive working stroke.

In the present invention I utilize means for elevating or lowering the rotary tool head or perforating wheel. which means are manually controlled and may be operated while the tool is performing either its working stroke or its return stroke, in order that the degree of penetration of the spikes on the perforating wheel may be varied as desired and the tool holder and rotary tool, elevated, lowered, or secured in adjusted position with relation to the work and the carriage for the tool. The control means is movable with the reciprocating carriage, but the operating device or hand wheel for the control means is stationary in order that it may be readily accessible to an attendant or operator.

The invention consists in certain novel combinations and arrangements of parts as will hereinafter be more fully pointed out and claimed. In the accompanying drawings I have illustrated one complete example of the physical embodiment of my invention wherein the parts are combined and arranged according to the best mode I have thus far devised for the practical application of the principles of my invention.

Figure 1 is a top plan view of the machine showing the manually controlled adjusting mechanism, and the driving mechanism of the carriage, both in dotted and full lines.

Figure 2 is an enlarged cross sectional view of Figure 1 illustrating the sectional shaft of the adjusting mechanism of my invention and its relation to the tool holder or vertically reciprocable rack bar.

Figure 3 is an enlarged view in side elevation of the carriage, tool holder and rotary tool, together with a portion of the overhead rails or track for the carriage.

Figure 4 is an enlarged detail sectional view at line 4—4 of Figure 3.

In order that the general arrangement and relation of parts may readily be understood I have illustrated a sufficient number of parts of the machine as to show its utility and operation, involving the use of an overhead carriage 1 that reciprocates on the rails or track 2. The carriage is provided with customary rollers or wheels 3 and a motor 4 with a driving crank 5 and pitman 6, shown in Figure 1 are used to impart the horizontal reciprocating motion to the carriage. A clutch device is indicated at 7 in Figure 1 and the motor causes the carriage to reciprocate between the bumpers 8 and abutments or stops 9 at opposite ends of the tracks. At the end of the working stroke of the carriage, i. e., at the left end in Figures 1 and 3, a lifting frame 10 is elevated by contact with guide bars or rods 11, in order that the perforating tool may be returned to the right end of the machine while in inoperative position, and the tool is then again returned to normal operating position for perforating the pole P in Figure 3 as the wheel or rotary tool head 12 travels to the left in Figure 3.

The rotary head or perforating wheel 12 is provided with radially extending spikes or spurs 13, preferably arranged in a plurality of circular series or rows and projecting from the periphery of the rotary tool head. The tool head or perforating wheel is journaled with its shaft 14 in the forked bearing bracket 15 which is located at the lower end or the bottom end stem or rack bar 16. This stem or rack bar is located in a vertical plane and is vertically reciprocable in the tubular holder or housing 17 that is rigidly secured to the carriage 1 of the machine.

By vertically reciprocating the rack bar or stem 16 in the holder or housing, it will be apparent that the perforating wheel or rotary tool head may be elevated or lowered, and means are provided for holding the stem in its adjusted position. For coaction with the rack bar 16 I provide a worm screw 18 that revolves with the vertically arranged stud shaft 19 journaled in bearings 20 of the tool holder or housing. On its upper end the worm screw 18 is fashioned as a bevel gear 18' and with this bevel gear a complementary pinion 21 coacts, the pinion being fixed on the end of a stud shaft or short shaft section 22 that is journaled in bearing bracket 23 fixed to the housing or tool holder, and provided with a yoke 24 of a universal joint 25.

The shaft section 22 and universal joint 25 form parts of the extensible and flexible adjusting shaft of my invention, which adjusting shaft extends when in normal position, transversely of the machine and transversely of the line of travel of the carriage and its perforating wheel. A portion of the adjusting shaft travels with the reciprocating carriage and a portion of the shaft remains stationary with the operating means for the adjusting shaft.

The extensible shaft includes the telescoping members 26 and 27, the former having polygonal or angular faces and reciprocable or telescoping within the complementary tubular member. At the end of the tubular member a universal joint 28 is provided similar to the universal joint 25 at the end of the angular shaft 26.

A stud shaft or short shaft section 29 forms part of this universal joint 28, and this section is journaled in bearing 30 secured on the top face of the frame bar 31 of the machine that extends parallel with the tracks or rails of the carriage. A hand wheel 32 is fixed on the wheel shaft 29, and it will be apparent that through this hand wheel and the flexible, extensible shaft, the bevel pinion and gear, and the worm screw and rack bar or tool holder, the perforating wheel may be adjusted, and the meshing of the worm screw with the rack bar retains the parts against relative movement after the adjustment has been secured.

The rotary driving mechanism and its movement are indicated by dotted lines in Figure 1, and the range of movement of the extensible and flexible, sectional adjusting shaft is also indicated by full lines and dotted lines in Figure 1. The shaft section 22 travels with the carriage and the shaft section 29 is non-traveling, while the telescoping inner portion of the extensible shaft and the spaced universal joints 25 and 28 permit the rotary and flexible movements of the shaft.

Having thus fully described my invention what I claim as new and desire to secure by Letters Patent is—

1. In a pole perforating machine the combination with a reciprocable carriage and tool holder, and a reciprocable tool in the holder, of an extensible, sectional, and flexible shaft normally disposed perpendicular to the line of travel of the carriage and means actuated thereby for adjusting the tool holder relatively to the carriage, said shaft having a non-traveling portion, and means for operating the shaft.

2. In a pole perforating machine the combination with a reciprocable carriage, a tool holder thereon and relatively reciprocable thereto, and a reciprocable tool in the holder, of an extensible, flexible, sectional shaft having a non-traveling section and a traveling section, means actuated by the traveling section for adjusting the tool holder relatively to the carriage, spaced means for permitting flexure of the shaft, and means intermediate the spaced means for permitting extension and shortening of the shaft.

3. In a pole perforating machine the combination with a reciprocating carriage and its tool holder and a reciprocable tool in the holder, of an extensible, sectional, flexible adjusting shaft comprising a traveling section and means actuated thereby for adjusting the tool relatively to the carriage, a non-traveling section for the shaft, and extensible and flexible portions between said traveling and non-traveling sections.

4. In a pole perforating machine the combination with a reciprocating carriage, its tool holder, and a reciprocable tool, of an adjusting shaft for said tool comprising a traveling section journaled on the holder and means actuated thereby for adjusting the tool, a non-traveling section and means for turning it, a pair of telescoping sections and a pair of universal joints between said traveling section and non-traveling section.

5. In a pole perforating machine the combination with a reciprocating carriage, its tool holder and a reciprocable tool, of an adjusting shaft comprising a traveling section journaled on the holder and means actuated thereby for adjusting the tool, a non-traveling shaft section and a hand wheel therefor, a tubular shaft section and a telescoping shaft section having polygonal faces, and a pair of universal joints connecting the tubular section and the non-traveling section and the telescoping section and the traveling section.

In testimony whereof I affix my signature.

ALLEN B. YORK.